Jan. 24, 1961  R. M. WILLIS  2,969,074
CAMPING SHELTER
Filed April 17, 1959  2 Sheets-Sheet 2

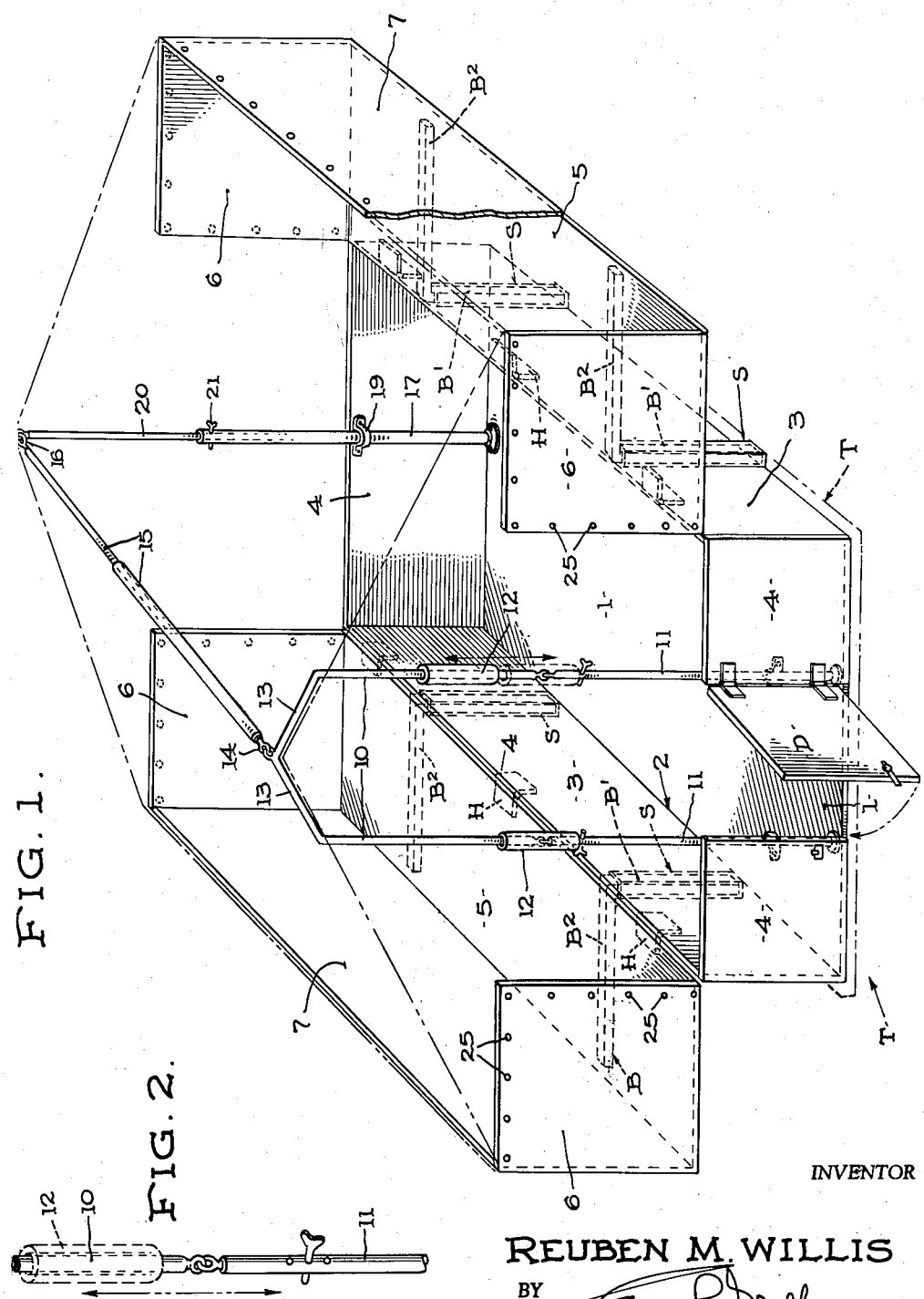

INVENTOR
REUBEN M. WILLIS
BY
ATTORNEY

United States Patent Office 2,969,074
Patented Jan. 24, 1961

2,969,074
CAMPING SHELTER
Reuben M. Willis, 18 S. Wilson, Chanute, Kans.
Filed Apr. 17, 1959, Ser. No. 807,079
1 Claim. (Cl. 135—3)

This invention relates to weatherproof shelters for use by campers and other outdoor enthusiasts.

One of the objects of the invention is to provide a shelter more particularly adapted for mounting on either a pick-up truck body or trailer chassis. In that connection, it is proposed to provide hingedly connected members which when erected, provide bunk type beds and when in folded or knockdown position admit of ready storing or transportation with a minimum of space requirements.

One of the distinctive features of the invention is to provide a shelter including horizontal bedding supports which may be supported in outboard fashion in relation to the vehicle by any suitable means such as angular brackets which may be carried by a side wall in collapsed and out of the way position or fitted in suitable means on the vehicle body.

With the above and other objects in view which will appear as the nature of the invention is better understood, the invention consists in the novel construction, combination, and arrangement of parts, hereinafter more fully described, illustrated and claimed.

A preferred and practical embodiment of the invention is shown in the accompanying drawings, in which:

Fig. 1 is a perspective view of the shelter in its erected position on the body of a truck or trailer chassis shown in dotted lines.

Figure 2 is a detail view of the upright framing supports which are hingedly connected for purposes of collapsing, and held in rigid upright position by a sleeve.

Similar reference characters designate corresponding parts throughout the several figures of the drawings.

Figure 3:
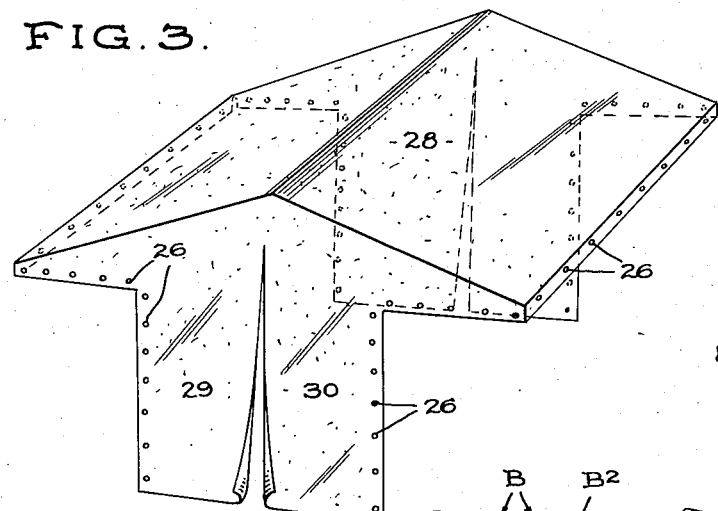
Fig. 3 is a detail perspective view of the canvas canopy or roof used in connection with the shelter shown in Fig. 1.
Figure 5:
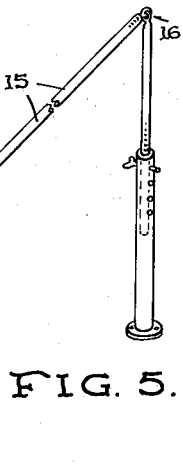
Fig. 5 is a detail view of a modified form of standard including telescopic parts which are held in adjusted elevated position by means of a pin or key passing through registering openings in the sides of one of the parts of the standard.

The collapsible shelter unit, as will be seen from Fig. 1 includes in its general organization, a floor panel 1 intended to be of a size to readily fit on a trailer chassis or in a pick-up truck body.

The opposite marginal edge portions of floor panel 1 are rigidly connected at 2 with the elongated upright side walls 3 and are also rigidly connected to the front and rear portions of the floor by the end panels 4. The front end panel may be in one piece, extending across the width of the front portion of the floor, but the rear panel may be divided to provide a space to accommodate a door section as will hereinafter appear.

The upper edge portions of the rigid upright side walls 3 are connected by appropriate hinges H with the inner edges of a related bedding support 5. Each bedding support is provided at opposite ends with a panel 6 which rigidly connects a guard wall 7 therewith.

Thus, when 5, 6 and 7 are turned outwardly relative to the side walls 3, the inner edges of 4 and 6 are disposed at right angles as shown in Figure 1. In this case, the bedding supports 5 rest on the horizontal arm portions of suitable brackets about to be described.

Figure 7:
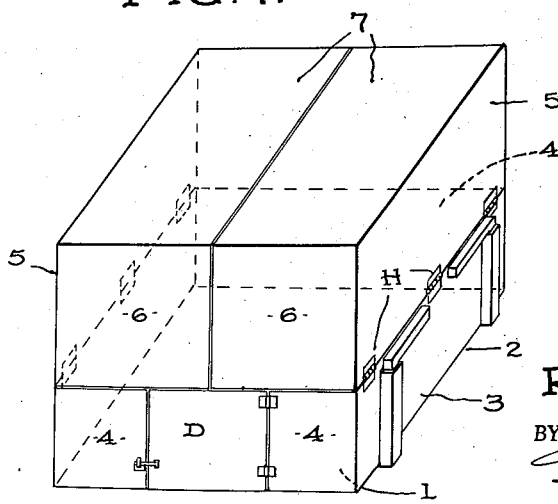
Fig. 7 is a detail perspective view of the unit of Fig. 1 collapsed for transportation on a vehicle body.

Each of the brackets is preferably made of square hollow tubing and includes a sleeve portion S which may be secured, as shown in Fig. 7, to the outer face of the side walls 3 and telescopically receive the vertical arm B' of an angular horizontally disposed bed element supporting arm B².

When the camping unit is mounted on a pick-up truck body as indicated by the dotted lines T in Figure 1, the sleeves S may be fitted in stake openings of the truck body and the vertical arms B' of the brackets are detachably inserted in the sleeves, thereby enabling the arms B² to hold the bedding supports 5 in horizontal position.

Figures 4, 6:
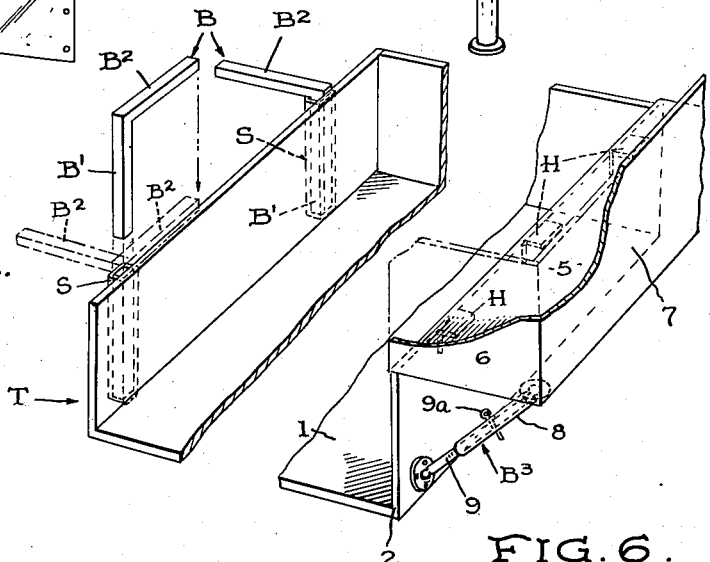
Fig. 4 is a detail perspective view illustrating diagrammatically how the stake openings of a truck body may be used for receiving the angular bedding support brackets.
Fig. 6 is a detail vew showing telescoping parts for fixing the position of the bedding supports.

By way of illustrating the flexibility of the invention with respect to the use of the brackets for the bedding supports, further reference may be made to Figure 7 which shows the erected camping unit of Figure 1 in its collapsed position. In this arrangement, the sleeves and angular members may be fitted directly to the outer faces of the side walls 3. That is to say the sleeve portions S may be secured to the outer faces of the side walls 3 and the vertical arm B' of the bracket may be withdrawn from the sleeve and placed in a manner that the horizontal arm B² will be at right angles to the wall 3 as shown in Figure 1 or parallel thereto as shown in Fig. 6. In other words, when the angular bedding supports are used as a part of the side walls 3, the vertical arms B' may be lifted out of the sleeves so that the angular position of the arms B² will be either at right angles to the outer end of the wall 3 or parallel thereto in order to enable the trailer truck body to travel along the highway without interfering with other vehicles.

In place of the angular brackets, it is possible to use a bracket B³ comprising two telescoping sections 8 and 9 held in set extended position by a pin or key 9ª, as shown in Fig. 6, while the outer extremities are secured to the side wall 3 and bedding support 5. When they are separated, they may be secured to their respective members by any conventional clamp.

The shelter floor panel 1 has suitable roof supporting means attached thereto as shown in the drawing. The roof, as will presently appear, is preferably canvas or other flexible weatherproof material reinforced by ropes or heavy cords. For example this supporting means may be constituted at one end by upright spaced door frame members comprising sections 10 and 11 connected by pivot eyes and held in the erected postion by moving the sleeve 12 over the eye type pivotal connection between the sections 10 and 11. The members 10 are provided at their upper ends with inclined purlin elements 13—13 which in turn are pivotally connected at 14 with one end of a telescopically extensible ridge pole 15 whose end 16 is in turn pivotally connected to a vertical standard 17 secured to rear panel 4 by clamp 19 and an upper section 20 which are held erected by a set screw 21.

The free edge portions of the end panels 6 and the similar edges of the guard panels 7 are provided with turn-button type fastening anchors 25 thereby to receive mating fastener eyes 26 secured to the edge portions of the canvas top 28. This top is supported by the telescopic ridge pole 15 and includes the front end wall portions 29 and 30 disposed at each side of the door frame members 10. The rear wall may be one piece of canvas or slit as shown.

The doorway provided by the members 10—11 may have the canvas walls 29 and 30, or a rigid door D, connected to the spaced door frame members 10—11 for swinging movement.

I claim:

In a camping shelter of the type including a body having a floor and side walls, said side walls comprising lower sections fixed to opposite edges of the floor and upper sections hinged to said lower sections to swing outwardly, the combination, comprising, a collapsible and erectable canopy frame including upper and lower rear doorway forming frame members, each consisting of vertically disposed spaced portions, the lower ends of the spaced portions of the lower member being secured to the floor and whose upper ends are provided with transverse pin receiving openings and are also flexibly joined with the spaced frame portions of the upper doorway forming member, sleeves slidable on the opposite spaced portions of the upper and lower frame members and when resting on a pin in a related pin receiving opening holding the spaced portions of both frame members erect in longitudinal alinement, said upper doorway forming frame members having intersecting inclined purlin portions, a ridge pole comprising rear and front telescoping members, a joint connecting the rear member with the intersection of the inclined purlin portions, a front upright frame comprising bottom and top telescoping elements, said bottom element secured to the floor and said top element having a flexible joint connection with the front member of the ridge pole, and adjustable pin-connected telescoping supports joining the said hinged sections of the side walls with the fixed sections thereof.

References Cited in the file of this patent
UNITED STATES PATENTS

| | | |
|---|---|---|
| 1,241,342 | Chapman | Sept. 25, 1917 |
| 1,499,972 | Canfield | July 1, 1924 |

FOREIGN PATENTS

| | | |
|---|---|---|
| 352,534 | Great Britain | July 10, 1931 |